*INVENTOR.*
TOM N. CORNSWEET
HEWITT D. CRANE
BY

ATTORNEYS

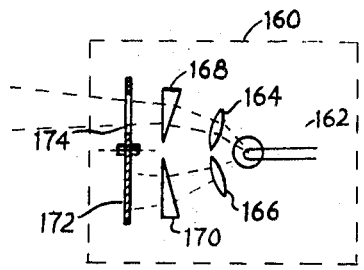
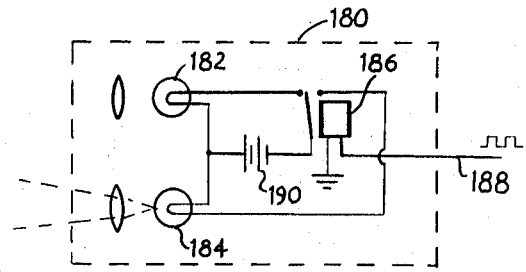
FIG. 8          FIG. 9
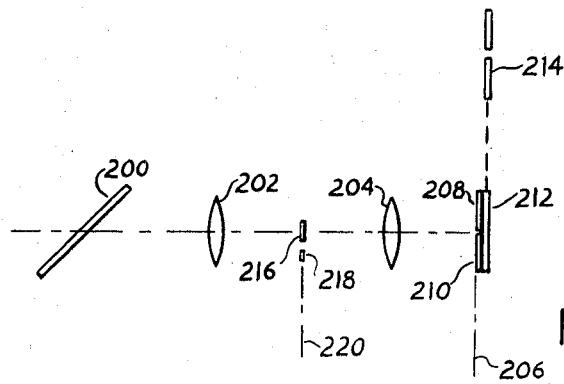
FIG. 10
INVENTORS
TOM N. CORNSWEET
HEWITT D. CRANE
BY
*Lindenberg + Freilich*
ATTORNEYS 3,536,383
AUTOMATIC OPTOMETER FOR MEASURING THE REFRACTIVE POWER OF THE EYE
Tom N. Cornsweet, Berkeley, and Hewitt D. Crane, Portola Valley, Calif., assignors to Stanford Research Institute, Menlo Park, Calif., a corporation of California
Filed Oct. 9, 1967, Ser. No. 673,680
Int. Cl. A61b 3/10, 3/00
U.S. Cl. 351—6
6 Claims

ABSTRACT OF THE DISCLOSURE

An optometer for measuring the refractive power of the eye, comprising a lens system for projecting rays onto a small area of the eye lens which focuses the rays into an image on the retina, a vibrator or other system for causing the light beam to pass through different areas of the eye lens, a detector for determining whether the image on the retina moves as the light beam passes through different areas of the eye lens, and a mechanism for altering the incoming light beam until the image on the retina does not move.

BACKGROUND OF THE INVENTION

The invention described herein was made in the performance of work under a NASA contract and is subject to the provisions of section 305 of the National Aeronautics and Space Act of 1958, Public Law 85-568 (72 Stat. 435; 42 U.S.C. 2457).

This invention relates to apparatus for measuring the eye, and while not limited thereby, is directed especially to apparatus for measuring the refractive condition of the eye.

The measurement of the refractive condition of the human eye is made for a number of reasons. One important reason is to fit a subject for glasses to correct for near or far-sightedness, or for astigmatism. Another reason is to study the accommodation characteristics of the eye, for example, the speed of response to changing views and the maximum focusing power.

The determination of the gross refractive condition of the human eye to fit a subject for glasses, is often accomplished by requesting the subject to view a target through various lens combinations, which are changed until the subject determines that the image is clearest. This procedure is time consuming and often inaccurate, especially when testing children. Optometers for this purpose have been proposed wherein a wide beam of light is directed through the eye lens to form an image on the retina, and the degree of focus of the image on the retina is determined by converging the light passing back out of the eye to form an image and measuring the sharpness of the image thus formed. In such optometers, difficulty is experienced in measuring sharpness of the image obtained from the light passing back out of the eye lens, partly due to the requirement that light of low intensity be used to form the image on the retina in order to prevent discomfort in the patient. These difficulties have limited the usefulness of instruments of this type.

The investigation of the accommodation characteristics of the human eye requires automatic equipment which indicates refractive power under a wide variety of conditions, and which has a rapid enough response to indicate at every instant how the eye is accommodating. Such studies are useful in fundamental research on the eye and its relationship to the brain. For example, it has been found in preliminary studies that human subjects divide into three basic types in viewing objects under monochromatic light: approximately one-third have normal accommodation, approximately one-third do not accommodate the eye lens to changes in distance of the object, and approximately one-third steadily change the focal power of the eye lens in the same direction regardless of the direction of the change in distance of the object. Various studies have been proposed which require measurements of the speed of accommodation, the minimum distance to which the eye can accommodate, and other characteristics, all of which require an instrument which can rapidly measure the refractive powers of the eye for a wide range of refractive powers. Heretofore, instruments for making such measurements have not been available.

Accordingly, it is an important object of this invention to provide an instrument for measuring the refractive power of the eye rapidly—in a fraction of the time required for the eye to accommodate to new conditions— and for a wide range of refractive conditions of the eye.

SUMMARY OF THE INVENTION

The present invention measures the focusing power of the eye by projecting narrow beams of light at at least two small areas of the entrance pupil of the eye, the refractive surfaces of the eye directing the beams at the retina. The refractive elements of the eye are primarily the air-to-cornea interface and the various interfaces related to the lens within the eye. For general purposes, all of these elements may be considered as a single refractive element, which will be referred to herein as the eye lens. If the angles at which the beams strike the eye lens are properly related to the focusing power of the eye lens, the beams will be directed onto the same area of the retina, i.e., they will completely overlap. If the relative angles of incidence of the beams and the focusing power of the eye lens are not properly related, the images will be separated. A determination of whether the several beam "images" on the retina are overlapping or not is made by directing light passing back out of the eye lens through a converging lens which forms an image of the light patterns on the retina. The relative angles of incidence of the narrow beams on the eye lens are then altered to make the retina images overlap, and the angles required to achieve overlapping indicate the refractive power of the eye lens. If the eye is focused at infinity, for example, two parallel beams of light striking the eye lens will be directed to the same area of the retina. If the eye is properly focused for a distance less than infinity then the beams of light must diverge from each other instead of being parallel, in order to completely overlap at the retina.

In an embodiment of the invention, the beams passing through different areas of the eye lens are obtained by utilizing a single beam which moves back and forth across the eye lens. If the lens is properly focused in relation to the angle of the beam, the image on the retina will not move. Light which passes out of the eye lens to form an image of the retina pattern on a detector, will remain stationary if the image on the retina is stationary. If the eye is focused for a longer distance than the apparent distance of the moving light beam entering the eye, then the image on the retina moves in the same direction as the movement of the light beam across the eye lens. By detecting the direction of movement of the retinal image with respect to movement of the beam of light, the angle or apparent distance of the beam can be altered until the image on the retina does not move. The angle or apparent distance of the beam required to achieve a stationary retinal image indicates the focal power of the eye under the conditions of the test.

In one optometer constructed in accordance with the invention, a very small light source is utilized which is vibrated perpendicular to the axis of the light beam it generates. The light from the source is collimated and directed past a stop with a narrow slit. The light passing through the slit is converged by a lens to form an image of the source on the eye lens of the subject, so that only a narrow beam of light passes through the eye lens at any moment. The beam passing through the eye lens forms an image of the slit which falls behind, on, or in front of the retina, depending on the refractive state.

If the eye is focused at infinity, for example, and if the slit is positioned along the optical axis so that all beams striking the eye lens appear to come from infinity, then the image will fall on the retina and will be stationary. With the eye still focused at infinity, if the slit is moved toward the eye, the center of the beam will appear to originate from a close distance, and the eye lens will form images of the slit which overlap and are stationary at a point behind the retina. The defocused image on the retina will move across the retina in the same direction as that of the beam movements across the eye lens. On the other hand, if the slit is moved optically further from the eye, the image on the retina will move in a direction opposite to that of the beam.

The detection of any movement of the image on the retina is made by directing light eminating from the eye, through a converging lens and providing a half-plane stop where an image of the retinal pattern would be formed by the converging lens. If the image provided by the converging lens does not move, a constant amount of light passes the stop and strikes a photodetector placed behind the stop. If the image moves, then the amount of light striking the photodetector varies, and the phase of the variation with respect to movement of the source of light indicates whether the slit is too close or too far from the eye to provide for proper focusing on the retina. A servo system is provided which moves the slit along the optical axis in a direction to reduce movement of the image, until the image does not move. The position of the slit required to prevent movement of the image indicates the refractive power of the eye.

In the optometer, the eye is induced to focus at infinity (or some other distance) by providing a bright visual object apparently at infinity. The light from the vibrating source used to measure the refractive power of the eye is of infrared wavelength so that it is not detected by the eye. The measurement of astigmatism is made by measuring the refractive power along different diameters of the eye lens, which is accomplished, in effect, by rotating the device about its optical axis.

The measurements provided by the optometer of this invention are made in a fraction of the time required for the eye to accommodate to new conditions. Accordingly, the optometer allows readings to be made of the refractive power of the eye at brief intervals, thereby enabling studies to be made of the speed and manner of eye accommodation.

A more complete understanding of the invention may be had from the following description and claims, taken in conjunction with the accompanying drawings.

BRIEF DESCRIPTION OF THE DRAWINGS

FIG. 8 is a schematic diagram of another light source for use in an optometer of the invention;

FIG. 9 is a schematic diagram of still another light source for use in an optometer of the invention; and FIG. 10 is a schematic diagram of another system for detecting movement of images on the retina.

DESCRIPTION OF THE PREFERRED EMBODIMENTS

Figure 1A:
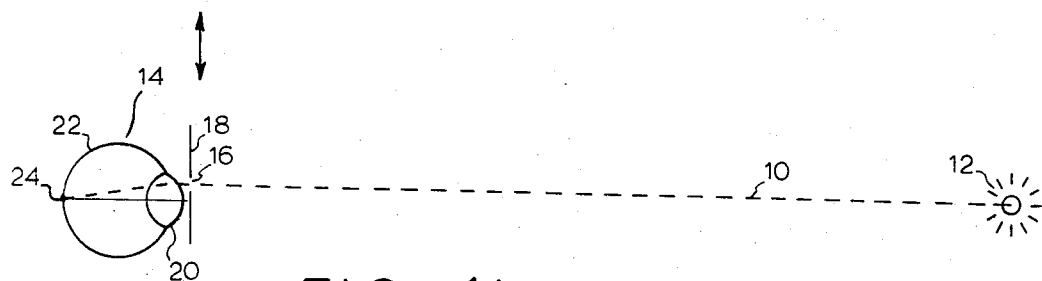
FIGS. 1A and 1B are representations of an eye focused at infinity viewing an object positioned at infinity through a movable aperture in two extreme positions.
Figure 1B:
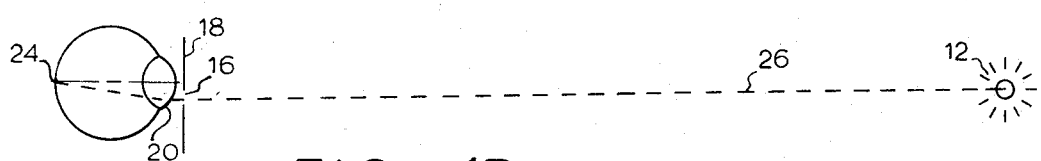

FIGS. 1A through 3B show the path taken by a beam of light from a source 12 located a large or infinite distance from an eye 14, in its passage from the source through an aperture 16 in a stop 18, through the lens 20, which is equivalent to the cornea and lens of the eye, and onto the retina 22 of the eye. The stop 18 is positioned immediately in front of the eye lens 20 and it vibrates up and down. In FIG. 1A, the eye lens 20 is properly focused at infinity and the light beam 10 strikes the retina at its center 24. In FIG. 1B, the situation is identical to that of FIG. 1A except that the stop 18 has moved down so that the aperture 16 is near the bottom of the eye lens 20. Another beam of light 26, which is practically parallel to the first beam 10 now passes through aperture 16. Inasmuch as the eye lens 20 is properly focused for infinity, the light beam 26 from the source 12 is focused at the same spot 24 at the center of the retina.

Figure 2A:
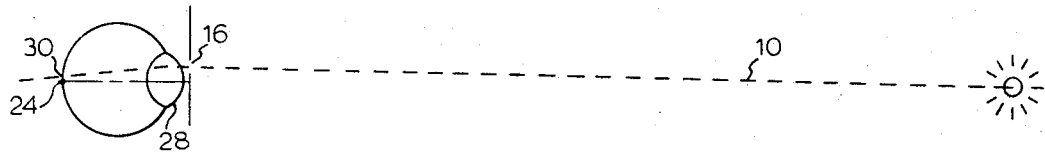
FIGS. 2A and 2B are representations of the eye and moving aperture of FIGS. 1A and 1B, for the case of the eye focused beyond infinity, that is, for converging rays.
Figure 2B:
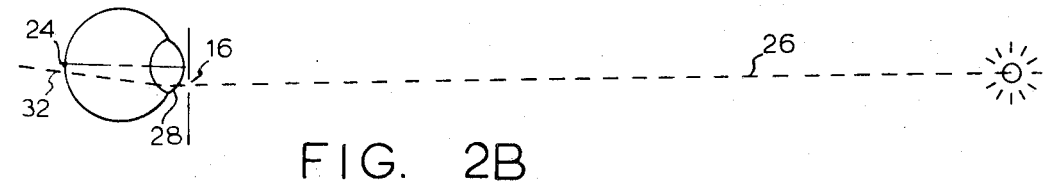

FIGS. 2A and 2B illustrate the situation where the eye is focused such that any object at infinity is focused behind the retina. In FIG. 2A the aperture 16 is near the top of the eye lens 28, and the light beam 10 passing through the aperture strikes the retina at point 30 above the center 24 of the retina. In FIG. 2B, the aperture is in its bottom position and the light beam 26 passing therethrough is intercepted at a point 32 which is below the center of the retina.

Figure 3A:
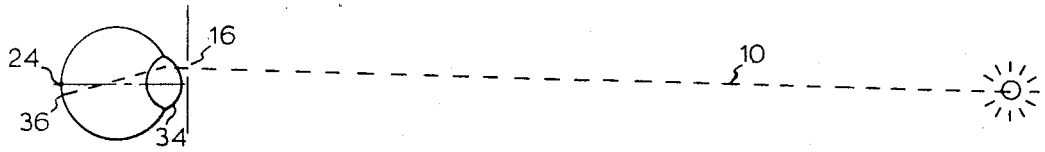
FIGS. 3A and 3B are representations of the eye and moving aperture of FIGS. 1A and 1B, for the situation where the eye is focused at a distance less than infinity.
Figure 3B:
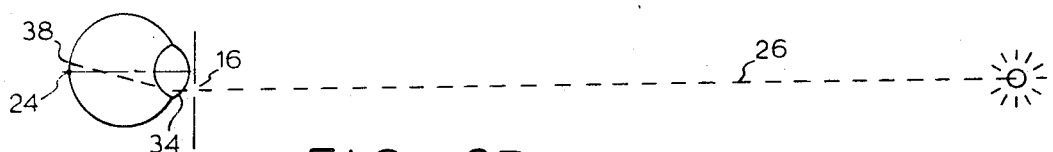

FIGS. 3A and 3B illustrate the situation for an eye focused at a nearby point instead of at infinity. In FIG. 3A, wherein the aperture 16 is in its uppermost position, the light beam 10 passing through the aperture strikes the retina at point 36 which is below the center 24 of the retina, while in FIG. 3B the beam 26 passing through the aperture is intercepted at point 38 which is above the center of the retina.

It can be seen from FIGS. 1A through 3B that the focusing power of the eye can be determined by projecting a narrow beam through the eye lens and moving it back and forth across the lens while observing the the image on the retina. If the image on the retina does not move; then the eye is focused at the distance at which the light source is placed. If the image on the retina moves in the same direction as the aperture, as in FIGS. 2A and 2B, then the eye lens is not sufficiently strong (in refractive power), while if the image on the retina moves opposite to the direction of movement of the aperture as in FIGS. 3A and 3B, then the eye lens is too strong. While a stop 18 with a small aperture in it can be used, the moving aperture would be distracting to the eye and would make it difficult to provide a visual image which the eye can concentrate on during the test. Instead of moving a stop with an aperture in it, the invention provides light means for projecting two light beams laterally spaced from each other at the eye lens, but each beam having rays with a single apparent distance of origin. One embodiment of the invention, to be described, uses as a light means, apparatus that provides a narrow stream of light which is concentrated or focused to a small area at the eye lens. The apparatus also includes a vibrator which moves or vibrates the narrow stream back and forth across the lens while maintaining a constant apparent point of origin of the stream, thereby providing many beams of light which enter the eye lens at different areas of the lens. The beam alternately appearing on opposite sides of the eye lens due to such vibration are the most important for enabling detection of movement of the image on the retina.

Figure 4:
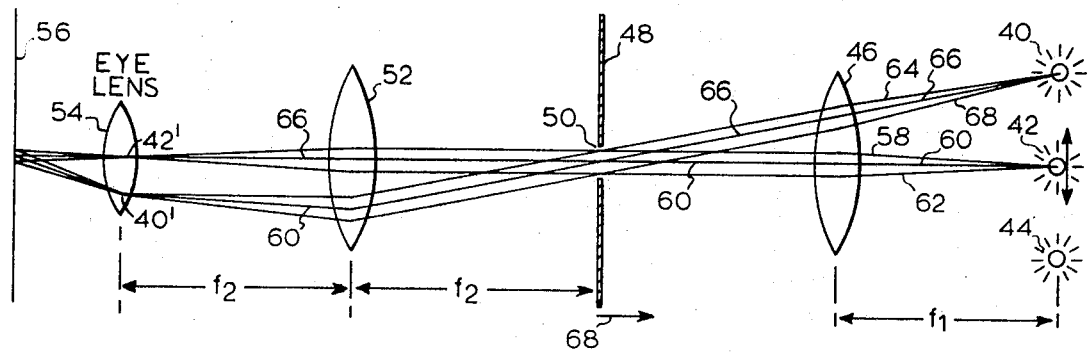
FIG. 4 is a representation of the input optical system of an embodiment of the invention.

FIG. 4 illustrates means by which the present invention provides a beam which is very narrow at the eye lens, yet whose center appears to have a constant point of origin. In the diagram of FIG. 4, light is obtained from a very small source 40 such as the end of a fiber optic bundle whose other end is illuminated by a concentrated light source. The light source 40 which generates the stream of light from a limited area moves up and down between the positions shown at 40, 42 and 44, all positions being in the plane of the drawing. Light from the light source passes through a lens 46 positioned a distance $f_1$ from the light source 40 (at every position taken by the light source) equal to the focal length of the lens 46. Thus light from the light source is collimated by the lens 46.

A stop 48 is positioned in front of the lens 46 to stop all of the light therefrom except light passing through a narrow aperture 50, which may be either a hole or a slit. Light passing through the aperture 50 proceeds to a second lens 52 located a distance $f_2$ equal to the focal length of the second lens 52. Light passing through the second lens 52 continues on to the eye lens 54 located a distance $f_2$, equal to the focal length of the second lens 52, from the second lens 52. Light passing through the eye lens 54 continues on until it strikes the retina 56 of the eye. The collimated light beams passing through the second lens 52 form an image of the light source at the eye lens 54, e.g., images 40' and 42', corresponding to light source positions 40 and 42, respectively. Thus, only a very narrow beam of light, proportional to the area of the light source passes through the eye lens 54 at any instant.

FIG. 4 illustrates three bundles of light beams from a point on the light source in two of its positions 40 and 42 taken during its vibration up and down. It is assumed that the eye lens 54 is focused at infinity. In the middle position 42 of the light source, the three rays 58, 60 and 62 are radiated from the light source and collimated by the first lens 46. Other light rays are emitted from the source at 42, but most of them do not pass through the aperture 50 and are lost. The rays 58, 60 and 62, passing through the aperture 50 in the stop 48, proceed through the second lens 52, are focused in the middle of the eye lens 54 and are incident on the retina 56 as shown. In the extreme position 40 of the light source, the three rays 64, 66 and 68 from the source also pass through the first lens 46, the aperture 50, the second lens 52 and the eye lens 54. However, the three rays 64, 66 and 68 pass through a different part of the eye lens 54 on their way to the retina.

The effect of the eye lens 54 on the different beams passing through it can best be understood by considering the effect of the eye lens on the center rays 60 and 66 from the light source at its two positions 42 and 40. The center rays 60 and 66 pass through the aperture 50 at different angles, but are collimated (i.e., made parallel to each other) by the lens 52. The rays 60 and 66 are collimated by lens 52 because they appear to originate from the same point (the aperture 50) located a distance $f_2$ equal to the focal length of the lens 52, from the lens 52. The parallel center rays 60 and 66 entering the eye lens 54 appear to the eye to originate from infinity. Accordingly, the eye lens 54, which is focused at infinity, directs these two rays 60 and 66 to the same point on the retina. The two rays 58 and 64, which pass through a different point of the slit object, similarly converge, but at a different point on the retina. Similarly, the two rays 62 and 68 converge at still a different point on the retina. Thus, an image of the slit is formed on the retina, the light from each point of the slit coverging or focusing at a corresponding point in the image. This manner of creating a narrow light beam which moves back and forth across the eye lens enables the location of the eye lens 54 to be at a substantial distance from the nearest element of the instrument, yet enables the projection of a relatively strong beam of light at the eye.

It can be seen from FIG. 4 that the reason why the beams are brought to focus on the same part of the retina 56 for all positions 40, 42 and 44 of a light source is due to the fact that the eye lens is focused at infinity and the center rays of the beams emerging from the second lens 52 are parallel to each other and therefore apparently from a source at infinity. If the eye lens 54 is not focused at infinity, but is of even less refractive power, as in far sightedness, then the light on the retina will move up and down as the light source moves down and up, respectively, between the extreme positions 40 and 44, i.e., the retinal image moves opposite to the light source. In order to keep the position of the light on the retina from moving, the center rays 60 and 66 must not be parallel to each other, in passing through the eye lens, but must converge slightly. This can be accomplished by moving the stop 48 away from the second lens 52. A sufficient movement in the direction of the arrow 68 will result in the image on the retina 56 again becoming stationary.

If the eye lens 54 has increased focusing power, the image on the retina 56 will move up and down as the light source moves up and down, respectively, between its extreme positions 40 and 44, i.e., the retinal image and light source move in the same directions. To correct this, the stop 48 is moved toward the lens 52 in a direction opposite to the arrow 68, so that the center beams 60 and 66 emerging from the second lens are divergent, until the retinal image ceases to move. It should be noted that the light beams at the eye lens 54 will have the same cross section and brightness regardless of the position of the stop 48, since the "cross section" is really just the image of the light source, which is unaffected by the position of the stop 48.

Figure 5:
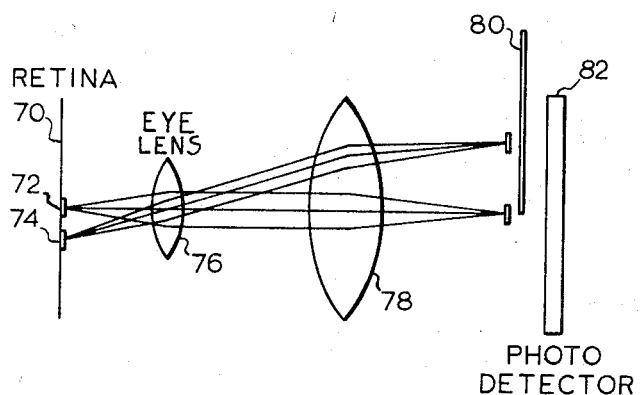
FIG. 5 is a representation of the output optical system of an embodiment of the invention.

FIG. 5 illustrates a detecting means by which differences in the position of the images on the retina is determined. In this figure, the retina 70 is shown illuminated at two areas 72 and 74, due to improper positioning of the stop (48 in FIG. 4) along the optic axis. The images 72 and 74 are shown spaced from each other to facilitate understanding. However, the optometer is generally constructed so that the images partially overlap even for a rapid eye accommodation wherein the optometer may lag slightly behind the change in refractive power of the eye. The light reflected from the positions 72 and 74 passes out of the eye through the eye lens 76 and through a third lens 78, which, it should be noted, is a distinct lens from the first and second lenses shown in FIG. 4. Light passing through the third lens 78 is partially stopped by a half-plane stop 80. Light which passes by the half-plane stop 80 is incident on a photodetector 82. If the image on the retina is stationary at a position such as that shown at 72, then nominally one-half of the light from the image at 72 passes by the half-plane stop 80 and is detected by the photodetector 82 while the rest of the light has been stopped by the stop 80. If the image on the retina moves, then the light striking the photodetector 82 varies. By noting whether or not the photodetector output varies, one can determine whether the input system provides light from a proper apparent distance.

If the output from the photodetector varies, the direction in which the input system stop must be moved to reduce movement to zero must be determined. As pointed out earlier, the image on the retina 70 moves in the same or opposite direction as the moving light source, depending on the polarity of defocus. Accordingly, by noting the phase of the signal from the photodetector 82 in relation to the movement of the light source, a determination is easily made as to whether the eye lens 76 is of too great or too little focusing power in relation to the apparent distance of origin of the light source. If the focusing power of the eye lens is too small, the stop 48 in FIG. 4 is moved back toward the light source until the output from the photodetector 82 is constant. However, if the output from the photodetector 82 indicates that the image on the retina is moving opposite to the movement of the light source, thereby indicating that the eye has too much focusing power, then the stop 48 is moved toward the eye.

In one embodiment of an optometer constructed in accordance with the invention, the eye is allowed to focus at infinity by providing a distant visual object on which the subject can concentrate. The light from the vibrating light source which is used to test the refractive power of the eye lens is obtained from an infrared source so that these light beams are not noticed by the person being tested. The use of infrared light also provides more light output from the eye because the retina reflects a much higher proportion of infrared light than it does of visible light incident thereon. Beam splitter mirrors are utilized to enable the visual image seen by the person and the infrared beams to be simultaneously projected into the eye. In addition to the basic input and output optical systems shown in FIGS. 4 and 5, other components are utilized in the optometer instrument. One of the more important of these is a stop and lens system for eliminating much of the light incident on the photodetector which represents reflections from the cornea or additional surfaces of the eye other than the retina. Another group of components enables the light source to be vibrated in various directions, to enable the measurement of refractive powers of the eye along different planes, and therefore to enable the measurement of astigmatism. Various of these additional components and systems will be described in connection with the description of a complete optometer.

Figure 6:
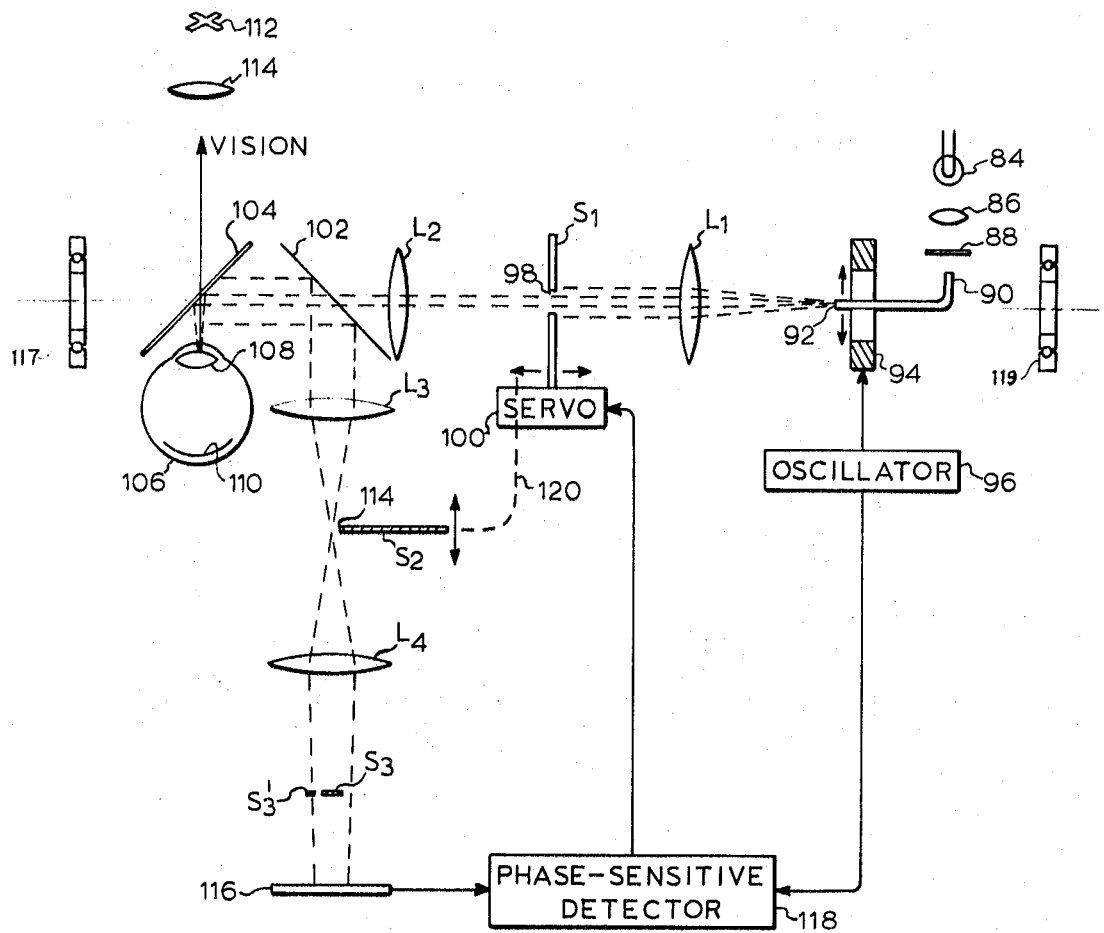
FIG. 6 is a schematic diagram of an optometer constructed in accordance with the invention utilizing the input and output optical systems of FIGS. 4 and 5.

FIG. 6 is a schematic diagram of an optometer constructed in accordance with the invention and utilizing the input and output means shown in FIGS. 4 and 5. The instrument comprises a high intensity bulb 84, such as a tungsten-iodine type, having a large output in the infrared range, a condenser lens 86 for concentrating the beam therefrom, a near infrared bandpass filter 88 for passing only infrared light, and a fiber optic bundle 90. The end of the fiber optic bundle 90 closest to the filter is stationary while the opposite end 92 is mounted on a vibrator apparatus 94. The vibrator apparatus 94 vibrates the fiber optic bundle back and forth along a line path. The vibrator, which may include loudspeaker-type field coils with a loudspeaker-type armature fixed to the fiber optic bundle, is driven by an oscillator 96. Light from the output end 92 of the fiber optic bundle passes through a first lens $L_1$ which is positioned a distance from the output end 92, equal to the focal length of the lens $L_1$. This results in the light beams passing through the lens $L_1$ being collimated.

The collimated light beams proceed to a stop $S_1$ which consists of an opaque disc completely blocking the light from lens $L_1$ except for such light as passes through a slit 98 in the stop. The slit extends in a direction orthogonal to the light beam and to the direction of vibration of the output end 92 of the fiber optic bundle. The slit $S_1$ is mounted on a linear servo motor 100 which can move the stop $S_1$ along the axis of the light beam in order to provide a motionless in-focus image on the retina of the eye. Light passing through the slit 98 in the stop $S_1$ proceeds onto a second lens $L_2$.

The second lens $L_2$ is positioned a distance from the first stop $S_1$ approximately equal to the focal length of the second lens $L_2$. In the case of an eye properly focused at infinity, the servo motor 100 will position the stop $S_1$ a distance exactly equal to the focal length of the lens $L_2$. However, in the case of an eye not focused at infinity, the stop $S_1$ will be shifted from such a position. Light passing through the lens $L_2$ proceeds onto a beam splitter mirror 102 which allows half of the light to pass therethrough toward a dichroic mirror 104. A dichroic mirror has the property of reflecting light of certain wavelengths such as infrared light, while allowing light of other wavelengths, such as visible light to pass through. The infrared light from the fiber optic bundle is reflected by the dichroic mirror 104 to the eye 106 of the person being tested. The distance from the second lens $L_2$ to the eye lens 108 is equal to the focal length of the lens $L_2$. Accordingly, the collimated beams passing through the lens $L_2$ from the slit 98 are focused in the plane of the eye lens 108. Inasmuch as the output end 92 of the fiber optic bundle is very small, the image of it passing through the eye lens 108 is very small and the light beam passes through only a small area of the eye lens. Preferably, this area has a diameter less than one-fourth of the eye lens opening under moderately low lighting conditions under which the tests are normally conducted. The light passing through the eye lens 108 is directed onto the retina 110 of the eye.

In order to induce the subject being tested to try to focus his eye at infinity, or some other predetermined distance, a visual object 112 is placed in front of the eye. Light from the object 112 may be made to appear to originate from any distance by suitable placement of a lens 114; for example, if the object 112 is positioned a distance from the lens 114 equal to the focal length of the lens 114, then light from the object 112 will appear to originate from infinity. The light from the object 112 passes through the dichroic mirror 104 into the eye 106. This is the only object noticed by the eye inasmuch as light from the fiber optic bundle 90 is primarily of infrared wavelength. Light from the object 112 which is focused on the retina 110 does not substantially interfere with the automatic optometer inasmuch as most of this light which passes out of the eye lens 108 thereafter passes through the dichroic mirror 104.

The infrared light incident on the retina 110 passes out of the eye lens 108, is reflected by the dichroic mirror 104, and half of it is thereafter reflected by the beam splitter 102 in a downward direction toward the lens $L_3$. If the eye 106 is focused at infinity, the light passing out of the eye lens 108 is collimated and therefore the light entering the lens $L_3$ is collimated. The lens $L_3$ therefore focuses the light rays into an image at a distance along the beam equal to its focal length. A second stop $S_2$, which is a half-field stop, is positioned a distance from the third lens $L_3$ approximately equal to the focal length of the lens $L_3$. If the eye 106 is focused at infinity, the stop $S_2$ will be spaced from lens $L_3$ at a distance exactly equal to the focal length of the lens $L_3$. The second stop $S_2$ is an opaque sheet with a straight edge 114 extending nominally diametrically across the field of the lens $L_3$, for blocking off nominally one-half of the field. Light passing by the stop $S_2$ continues toward a fourth lens $L_4$, passes a bar stop $S_3$, and is incident on a photodetector 116.

The photodetector 116 could be placed immediately in back of the second stop $S_2$ to detect movement of the infrared image on the retina of the eye. However, the fourth lens $L_4$ and third stop $S_3$ are included in order to remove extraneous reflections, principally those originating from surfaces on the cornea of the eye. The lens $L_4$ forms an image of the cornea at the plane of the third stop $S_3$, which thereby blocks such rays and prevents them from passing onto the photodetector 116.

The removal of corneal and other extraneous reflections is of great importance in the development of practical optometers in accordance with the invention. One of the possible sources of extraneous light is from the lens $L_3$, which would provide interferring light if the beam splitter mirror 102 were placed between lens $L_2$ and stop $S_2$, as has been proposed for optometer-type instruments. In such a case, some light directed at the eye through the lens $L_2$ would be reflected therefrom and would be reflected by the beam splitter mirror toward the photodetector 116. By placing the beam splitter mirror between the last lens $L_2$ and the eye station, such reflections are avoided.

Another source of extraneous reflections is from the cornea of the eye. The air-to-cornea interface typically reflects much more light than the retina, and these reflections must not be allowed to interfere with movements of light patterns on the retina. Because of internal reflections in the beam splitter, an additional corneal image is projected toward the lens $L_3$; while this additional corneal image is of low intensity compared with the directly reflected beams, it must be blocked also. This additional image is displaced laterally from the axis of the reflected beam, and is stopped by an additional stop $S_3'$, placed near the major corneal stop $S_3$.

The output of the photodetector 116 is delivered to a phase sensitive detector 118, which also receives signals from the oscillator 96 which vibrates the fiber optic bundle 90. The phase sensitive detector 118 drives the servo motor 100 which moves the first stop $S_1$ and the second stop $S_2$ along their respective optical axes. The first and second stops $S_1$ and $S_2$ are connected together as indicated by the dotted line 120 so that both move in unison. The arrangement is such that both stops $S_1$ and $S_2$ move along their optical axes toward the eye or away from the eye in unison.

If the eye is focused in a manner which results in the infrared image on the retina 110 not moving as the output end 92 of the fiber optic bundle is vibrated, then the amount of light passing the edge 114 of the second stop $S_2$ is constant. In such a case, the phase sensitive detector 118 does not cause the servo motor 100 to be energized and the stops $S_1$ and $S_2$ remain stationary.

If the image on the retina 110 moves as the output end 92 of the fiber optic bundle is vibrated, then the amount of light passing the edge 114 of stop $S_2$ varies and the output of the photodetector 116 varies. As a result, the phase sensitive detector 118 causes the servo motor 100 to move the stops $S_1$ and $S_2$ along the optical axis in a direction which reduces the movement of the image on the retina until the image no longer moves on the retina. A determination of which direction the stops must be moved along the optic axis is made in accordance with the phase of the output from the photodetector 116 with respect to the phase of the signal driving the oscillator 96.

If the eye 106 is focused for closer than infinity, while the slit 98 is at optical infinity, then in the system shown in FIG. 6, the image on the retina will move to the right as the output end 92 of fiber optic bundle moves up. As a result, the image at the plane of the second stop $S_2$ will move to the left and additional light will strike the photodetector 116, resulting in a larger signal to the phase sensitive detector 118. When the detector 118 senses that the output of the photodetector 116 increases while the oscillator 96 has a signal which moves the end 92 of the fiber optic bundle upward, then it drives the servo motor 100 to move the stop $S_1$ to the left, toward lens $L_2$. At the same time, the image of the retina formed by the third lens $L_3$ will move to a position closer to the lens $L_3$, and in order for the second stop $S_2$ to be positioned at the plane of the image, it is necessary to move it toward the lens $L_3$. Movement of the second stop $S_2$ as the first stop moves is accomplished by the connection indicated at 120 between the stops $S_1$ and $S_2$. If the lenses $L_2$ and $L_3$ have the same focal length, then the amount by which the stops $S_1$ and $S_2$ must be moved is the same. When the output of the photodetector 116 no longer varies, the detector 118 no longer drives the servo motor 100 to move the stops $S_1$ and $S_2$.

A measurement of the refractive strength of the eye is made by measuring the location of stops $S_1$ and $S_2$ at which the image on the retina remains steady. If the subject was viewing an object 112 apparently at infinity, a location of the stop $S_1$ to the right of an initial position spaced from the lens $L_2$ equal to the focal length of the lens $L_2$, denotes that the refractive power of the eye was even less than would be required to focus light from infinity. On the other hand, a location of the stop $S_1$ to the left of that position denotes that the eye was focused for a distance closer than infinity. The exact position of the stops indicates the exact refractive condition of the eye. The ability of the subject to focus at different distances than only at infinity can be determined by adjusting the position of the object 112 with respect to the lens 114 so that the subject attempts to focus his eye at a predetermined distance other than infinity. The position of the stops $S_1$ and $S_2$ for normal vision under these circumstances is easily determined, and deviations from these positions indicates the refractive strength of the eye under these circumstances.

The optometer instrument of FIG. 6 provides a closed loop system comprising the stops $S_1$ and $S_2$, the phase sensitive detector 118, and the servo motor 100. This system automatically moves the stop $S_1$ to the position corresponding to the refractive power of the eye lens, and the movement can easily be made substantially faster than the time required for the eye to accommodate to new conditions. Accordingly, a continuous reading of the positions of the stops $S_1$ or $S_2$ indicates the refractive power of the eye at every instant, and thereby allows close tracking of the eye during accommodations. If it is not necessary to rapidly track the eye, the stops $S_1$ and $S_2$ can be moved manually and the servo motor 100 dispensed with. An alternating current meter connected to the photodetector 116 can be used to indicate movement of the retinal image, and the stops can be moved until the AC reading is a minimum or zero. In this case, tracks or guides for enabling linear movement of the stop $S_1$ along the optic axis, such as those in the mechanical portion of a linear servo motor 100, serve as a position varying or altering means for manually varying or altering the distance of origin of the center rays of the beams passing through the eye lens.

The apparatus of FIG. 6 can also be employed to measure astigmatism. This is accomplished by rotating the line path along which the end 92 of the fiber optic bundle is vibrated in unison with rotation of the stops $S_1$, $S_2$ and $S_3$. This can be readily accomplished by manual rotation of the vibrator apparatus or by providing vibrating apparatus 94 which can shift the direction of vibration, as by two orthogonal loudspeaker vibrating coils. Additionally, apparatus can be provided for rotating the three stops. This can be done manually by positioning each of the stops in a rotatable holder, or with electrically energized position control apparatus such as Selsyns, well-known in the art. Perhaps the simplest way of allowing measurement along different diameters of the eye, and therefore to enable the measurement of astigmatism, is by providing bearings for rotating the entire optometer. Bearings 117 and 119 support the entire apparatus, except a station at which the subject's eye 106 is positioned, and permit rotation of the apparatus about a line connecting the bearings.

Figure 7:
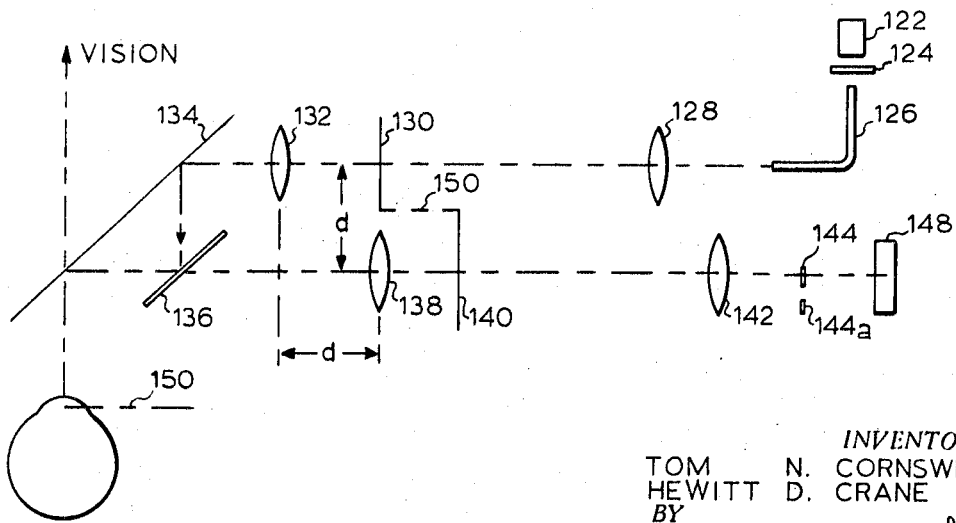
FIG. 7 is a schematic diagram of the optical system of a compact automatic optometer utilizing the optical system indicated in FIG. 6.

An automatic optometer has been constructed in accordance with the optical schematic diagram shown in FIG. 7. The apparatus includes a light source 122, an infrared filter 124, a fiber optic bundle 126, first lens 128, first stop 130, second lens 132, a dichroic mirror 134, a beam splitter mirror 136, a third lens 138, second stop 140, fourth lens 142, corneal stop 144, and a photodetector 148. In addition, a head rest is provided to hold the patient's head and establish an eye station 150 at which the eye lens normally will be located. It may be noted that the input and output optical paths are parallel, thereby providing a more compact instrument and simplifying the connection 150 between the first and second stops. The instrument was constructed with all of the lenses 128, 132, 138 and 142 being identical achromatic doublets having an 85 mm. focal length and 25 mm. diameter. This provides unity magnification in the input and output optical systems. The optics were folded with a separation $d$ between the input and output optical axes of 20 mm. The fiber optic bundle 126 was twelve inches long with an effective end area of approximately 1 mm., and was vibrated approximately one-quarter mm. on either side of its central position. It was illuminated at one end by a 45 watt high intensity tungsten-iodine bulb mounted in a conventional optical condenser system. A silicon photodiode 148 was utilized to detect the output light beam.

Various improvements can be employed to simplify construction or improve the performance of the optometers of the present invention. FIG. 8 illustrates another light source 160 for providing a beam at different areas of the eye, in place of the vibrating optic fiber bundle described above. The source 160 employs a lamp 162, lenses 164 and 166 for providing two intense light beams, optical wedges 168 and 170 for directing the two beams in a generally parallel direction, and a rotating wheel 172 placed in front of the wedges. The wheel 172 is opaque, but has an annular slot 174 near its periphery. As the wheel 172 rotates, by means of a motor drive (not shown), the slot 174 alternately uncovers the two laterally spaced beams passing through the two wedges 168 and 170. This provides a beam which switches or alternates between extreme positions, instead of continuously moving between the two extreme positions, or in other words, the apparatus supplies two laterally spaced beams, providing means which are alternately activated by the slot in the wheel 172. It should be noted that the beams must be collimated before passage through a slit on the way to the eye. The rotational phase of the wheel can be compared with the output of the photodetectors to determine the direction in which the stops must be moved.

FIG. 9 illustrates still another light source 180 comprising two lamps 182 and 184 laterally spaced from each other. A relay 186 energized by pulses at input 188 alternately connects the lamps to an energizing source 190. The phase of the signals at input 188 is compared to the output from the photodetectors to determine the direction in which the stops must be moved.

FIG. 10 illustrates another detector construction for determining whether the retinal image is moving, which employs two photodetectors. In this detector construction, infrared light from the eye passes through dichroic mirror 200, and through lenses 202 and 204 which form an image at the plane 206. Two separate photodetectors 208 and 210 are located at the image plane 206, and each detects the light at one-half of the plane. A plate 212 upon which both photodetectors are located is mechanically linked to the slit stop indicated at 214, through which light passes on the way to the eye. The outputs obtained from the two photodetectors 208 and 210 provide twice the signal output as is provided by the detectors described above. If the photodetectors are located at the image plane 206, then corneal stops 216 and 218 must be placed in front of this image plane. The lens 202 forms a corneal image at the plane 220, and corneal stops 216 and 218 block the corneal image to reduce interference with the retinal image formed at plane 206.

It may be noted that the area covered by each photodetector is only nominally one-half of the image plane 206. If the slit 214 is off the input optic axis, a stationary image on the retina will result in a stationary image displaced from the point where the optic axis passes through the plane 206. It is the position of a stationary image that defines the exact position of the adjacent edges of the photodetectors 208 and 210, the adjacent edges of the photodetectors defining a line that nominally bisects the image plane.

What is claimed is:
1. An automatic optometer for measuring the refractive condition of an eye which includes an eye lens and a retina comprising:
 an eye station for establishing the position of said eye lens;
 light means including a narrow light source for projecting light generally along a predetermined optical path, means for oscillating said light source perpendicularly to said optical path, a first lens for collimating light from said light source, aperture means for passing a portion of collimated light from said lens therethrough, and a second lens positioned in front of said aperture means for forming an image of said light source substantially in the plane of said eye lens;
 detecting means for detecting movement of said light beam on said retina; and
 altering means including means responsive to the phase difference between the output of said detecting means and movement of said means for oscillating, for moving said aperture means along said optical path in a direction to reduce movement of said beam on said retina.

2. Apparatus for measuring the refractive condition of an eye having a lens and retina comprising:
 means for projecting light rays having a single apparent distance of origin, at different areas of said eye lens at different times;
 detection means including means for forming an image of the retina of said eye, and photodetector means for detecting the amount of light falling on only one side of the plane of said retina image; and
 servo means coupled to said photodetector means for varying said apparent distance of origin of said light beams to reduce variation in the output of said photodetector means.

3. The apparatus described in claim 2 wherein:
 said means for projecting light rays comprises means for producing light alternately from laterally spaced positions, means for collimating light from said means for producing light, stop means having an aperture for passing collimated light rays, means for focusing collimated light rays passing through said aperture substantially in the plane of said eye lens;
 said photodetector means comprises a photodetector and a half-plane stop positioned in front of said photodetector; and
 said servo means includes means coupled to said stop means which passes collimated light rays and to said half-plane stop, to move them simultaneously to vary said apparent distance of said light beam while maintaining said half-plane stop in the plane of said retina image.

4. The apparatus described in claim 2 wherein:
 said means for projecting light rays comprises a fiber optic bundle, means for illuminating a first end of said bundle, and means for vibrating a second end of said bundle.

5. The apparatus described in claim 1 including: means for moving said light means to rotate said predetermined optical path along which said light moves over said eye lens, whereby to enable measurement of astigmatism.

6. The apparatus described in claim 1 including:
 lens means located along an optical path in front of said eye lens for forming at a first plane, an image of light patterns formed by said light means on said retina, and for forming at a second plane, an image of light reflected from the cornea of the eye;
 a stop of limited area positioned at said second image plane for blocking a center portion of the optical path to block corneal reflections; and said detecting means positioned behind said second image plane.

References Cited

UNITED STATES PATENTS 3,096,767  7/1963  Gresser et al. _____ 351—14 X

OTHER REFERENCES

Campbell et al., "High-Speed Infrared Optometer," JOSA, vol. 49, No. 3, March 1959.

Allen et al., "An Infra-Red Optometer . . ." Amer. J. Opt. and Arch. Am. Acad. Opt., vol. 37, 403–407 (1960).

Roth, "Record of Infrared Coincidence Optometer," Amer. J. Opt. and Arch. Amer. Acad. Opt., vol. 39, No. 7, July 1962.

Warshawsky, "High Resolution Optometer . . . Accommodation," JOSA, vol. 54, No. 3, March 1964.

Roth, "Automatic Optometer . . . Eye," Rev. Sci. Inst., vol. 36, No. 11, November 1965.

DAVID SCHONBERG, Primary Examiner

P. A. SACHER, Assistant Examiner

U.S. Cl. X.R.

351—1, 16